Patented Sept. 26, 1950

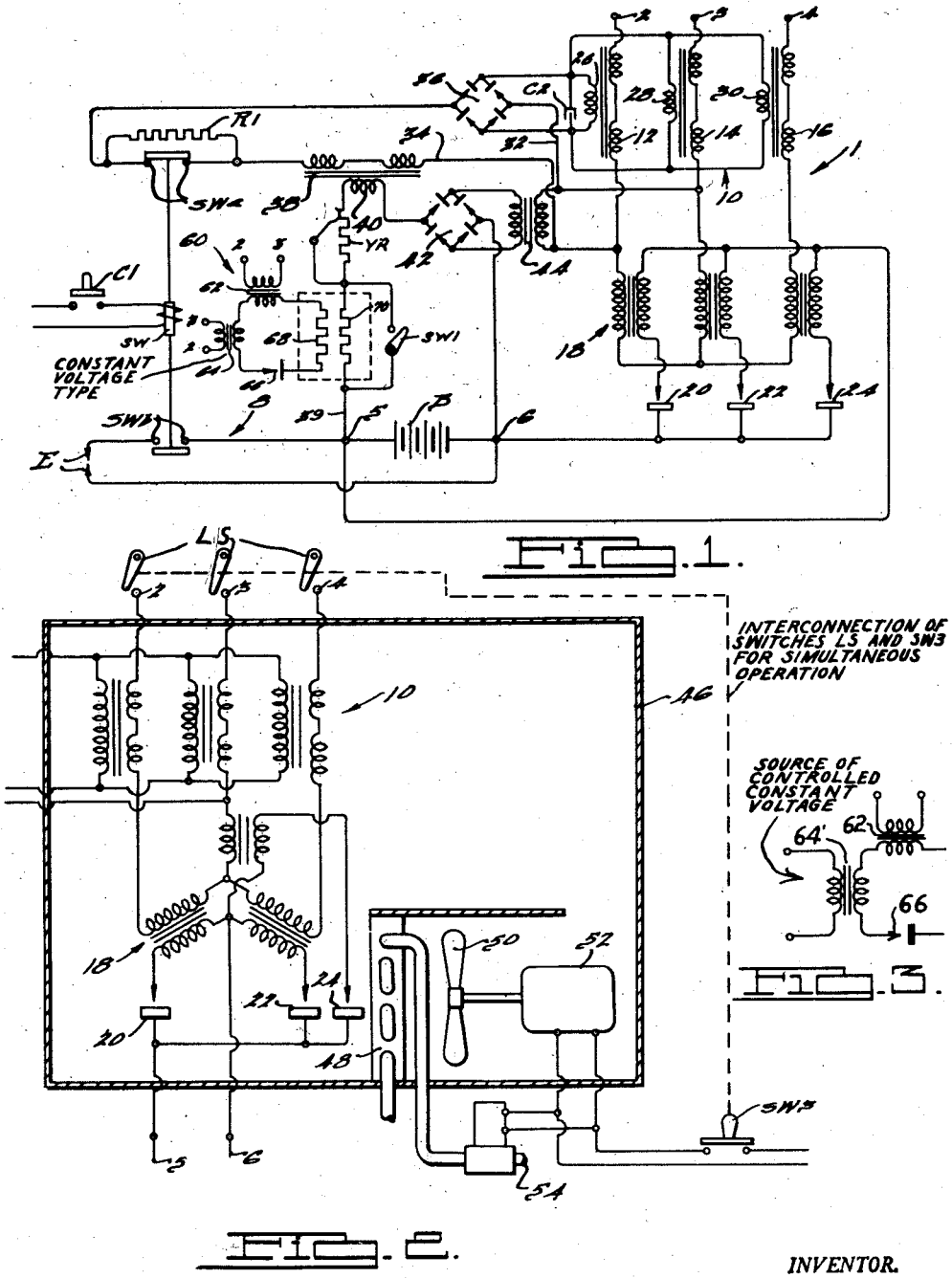

2,523,472

UNITED STATES PATENT OFFICE 2,523,472

SATURABLE REACTOR BATTERY CHARGER

Chester F. Leathers, Detroit, Mich., assignor to Progressive Welder Company

Application July 11, 1947, Serial No. 760,313

14 Claims. (Cl. 320—39)

This invention relates generally to electrical control systems and more especially to an electrical control system for controlling the charging operation of a battery. The battery-charging system is particularly adaptable for use with battery-powered welding systems such as, for example, is shown in the copending application of Fred H. Johnson and myself, Serial No. 479,998, filed March 22, 1943, now Patent No. 2,452,573, for Welding Method and Apparatus.

The principal objects of the present invention are to provide a new and improved battery-charging system of the character described; to provide such a battery-charging system which may be continually energized during the use of the battery and which is automatically controlled to maintain the battery in a fully charged state; to provide such a battery charger in which the controlled elements are arranged to provide extremely close regulation of the battery voltage; to provide a charger in which the rate of charging may be regulated between wide limits in accordance with slight changes in battery voltage; to provide such a battery-charging system in which the charging rate is controlled by a differential voltage which is equal to the difference between a control voltage and the battery voltage; to provide such a charging system in which the control voltage is varied in accordance with the rate of charging current to the battery; to provide means for varying the control voltage in a predetermined relation to changes in the charging rate; to provide a second means for controlling the charging voltage which is actuatable to reduce the charging voltage during periods when the battery is supplying its load circuit; to provide means for cooling the battery-charging network or control system whereby the charging system may be subjected to prolonged overload periods; and to provide generally improved electrical control systems of the character described.

With the above as well as other objects in view, which appear in the following description and in the appended claims, a preferred but an illustrative embodiment of the invention is shown in the accompanying drawing, throughout the several views of which corresponding reference characters are used to designate corresponding parts, and in which:

Figure 1 is a schematic view of a battery-charging system embodying the invention;

Figure 2 is a diagrammatic sectional view showing the cooling means for the charger; and Fig. 3 is a partial schematic view of a modified form of the invention.

It will be appreciated from a complete understanding of the present invention that the improvements thereof are, in a generic sense, applicable to a wide variety of types of electrical control systems. It is now preferred to utilize these improvements in connection with a battery for resistance welding, more particularly resistance spot welding, of various materials and, in an illustrative but not in a limiting sense, the invention is so disclosed herein.

The numeral 1 designates generally a battery-charging system having input terminals 2, 3 and 4, adapted to be connected to a three-phase sixty cycle power supply, of for example 440 volts, and having direct current output terminals 5 and 6 to which the terminals of a battery B, which is to be charged, are connected. A load circuit 8 is connected to the battery B through the terminals 5 and 6 and has a pair of welding electrodes E, the current to which is controlled by suitable switch contacts SWb. A three-phase saturable core-type reactance 10 is provided and has three power windings 12, 14 and 16; one terminal of each thereof being connected to the power-supplying terminals 2, 3 and 4, respectively. The other terminal of each of the windings 12, 14 and 16 is connected to one terminal of the primary winding of a three-phase Y-connected transformer 18. The Y-connected secondary windings of the transformer 18 are each connected through rectifiers 20, 22 and 24 to the output terminal 6 and the common terminals of the secondary windings are connected to the other terminal 5 of the charger.

Current through each of the windings 12, 14 and 16 is controlled respectively by core saturating coils 26, 28 and 30, which are shown as being parallelly connected and supplied from a suitable source of power through conductors 32 and 34 by means of a full-wave rectifier 36. One terminal of each of the saturating coils 26, 28 and 30 is connected to one of the direct-current output terminals of the rectifier 36 and the other terminals of these coils are connected to the other of the direct-current terminals of the rectifier 36. A condenser C2 is connected between the direct-current terminals of the rectifier 36 to smooth out variations in the direct-current output thereof.

The lines 32 and 34 are connected to and supply the two alternating current input terminals of the rectifier 36. Inserted in series in the conductor 34 and controlling current flow therethrough are the terminals SWa of the switch SW. A resistor R1 is connected in shunt around the contacts SWa so that when the contacts SWa are open circuited the rectifier 36 will remain energized at a lower voltage. The switch SW may be controlled by means of a contactor C1 controlling current to the energizing winding of the switch SW from a suitable source of supply or may be, as is more usual, one of the better known automatic welding contactor controls such as, for example, as shown in said Johnson and Leathers application Serial No. 479,998.

A saturating core-type reactor 38 is arranged in series in the conductor 34 and has a saturating control winding 40 having one terminal which may be connected by a conductor 39 having a switch SW1 and a variable resistor VR to the terminal 5 of the charger system and therethrough to one terminal of the battery B. The other terminal of the winding or coil 40 is connected to one of the direct-current output terminals of a full-wave rectifier 42. The other direct-current terminal of the rectifier 42 is connected directly to the output terminal 6 and therethrough to the other terminal of the battery B. The polarities of the terminals 5 and 6 and the direct current output terminals of the rectifier 42 are arranged to provide bucking D.-C. voltages whereby current flow through the winding 40 is proportional to the difference between the voltage of the battery B and of the rectifier 42. The alternating-current terminals of the rectifier system 42 are connected to opposite ends of a secondary winding of a transformer 44. The primary winding of the transformer 44 is connected to one input phase of the three-phase transformer 18. In order that the charger system may be compensated for changes in voltages in the supply connected to terminals 2, 3 and 4, a network generally designated 60 may be provided in the conductor 39 connecting terminal 5 with the winding 40. This network 60 comprises transformers 62 and 64 adapted to have their secondary windings connected in opposition and in series with a rectifier 66 and a resistance heater 68 in heat exchange relation with a temperature responsive current-controlling resistor 70 arranged in the conductor 39 in shunt relationship with the switch SW1. The primary windings of the transformers 62 and 64 are connected as indicated by the numerals 2 and 3 to the terminals 2 and 3. Transformer 62 is of the usual type in which the voltage in the secondary winding is proportional to that of its primary. The transformer 64 on the other hand is of the constant voltage type in which the output or secondary voltage is substantially constant irrespective of changes in voltage in the primary winding. If desired, the transformer 64 may be replaced by a transformer 64' of the same type as transformer 62 and its primary winding connected to a controlled source of voltage as indicated and which may be controlled in magnitude but which will remain substantially constant at any controlled value.

The rectifiers 20, 22 and 24 are preferably of the usual dry-disc type and these rectifiers 20, 22 and 24, together with the reactor 10 and transformer 18, are preferably located within a fluid-tight housing 46 having a water-cooled radiator 48 through which oil, which fills the interior of the housing 46, is propelled by means of a propeller 50 driven by a motor 52 also located within the housing 46. Energization of the motor 52 and a solenoid valve 54 controlling flow of cooling water through the radiator 48 is controlled by a switch SW3 which may be either automatically or manually energized simultaneously with closure of the line switches LS supplying the terminals 2, 3 and 4. It will be obvious that the housing 46 could be designed to operate without the propeller 50 under natural convection flow of the oil therewithin.

The provision of a totally enclosed fluid-cooled arrangement for the rectifiers is particularly desirable not only in instances such as presently described but in connection with other uses where the atmosphere in which the rectifier may be situated is of a corrosive or explosive nature such as, for example, adjacent an electroplating tank which under present usage requires the rectifiers to be located a substantial distance away and the current to be conducted thereto through heavy busses which are expensive and absorb energy from the system due to their electrical resistance.

It is believed that the remainder of the details of this invention may best be understood by reference to the description of operation thereof. When it is desired to place the system 1 in operation, the usual line switches LS and SW3 are closed whereby the terminals 2, 3 and 4 of the charging system 1 are energized with suitable voltage such as three-phase sixty cycle alternating current and solenoid valve 54 and motor 52 are energized.

A voltage will therefore immediately be applied through the reactor 10 to the conductors 32 and 34 supplying the rectifier 36 and to the transformer 44 supplying the full-wave rectifier 42. Assume the battery is fully charged and the potential across its terminals and, consequently, the terminals 5 and 6, is for example, 2.2 volts or a multiple thereof depending upon the number of series-connected cells of the battery B. For purposes of explanation, the battery will be considered as having one or more units of three series-connected cells in which the fully charged terminal voltage is 6.60 volts. The battery voltage appearing across the terminals 5 and 6 of 6.60 volts will have a determined relationship to that appearing across the direct-current terminals of the rectifier 42 so that the current flow through the saturating winding 40 of the reactor 38 is that required to regulate the reactor 10 to provide an output voltage of the rectifiers 20, 22 and 24 of substantially 6.60 volts. In the event it is desired to operate the system with the switch SW1 closed and to omit the compensating effect of the network 60, the value of this current may be zero. It is to be understood that the rectifier network 42 will prevent current from flowing through the winding 40 in a direction which would occur with the battery voltage B greater than the direct-current voltage across the network 42.

The reactor 38 being only partially saturated, or completely unsaturated, the current flowing through the rectifier network 36 and the parallelly connected windings 26, 28 and 30 supplied thereby will be at a desired value. Therefore, the drop in potential across the reactor 10 will be sufficient so that the voltage applied to the primary winding of the transformers 44 and 18 will be, for example, 350 volts. The voltage applied to the terminals 5 and 6 will be equal to or just slightly greater than 6.60 volts so that a trickle charge of perhaps 20 amperes, which when compared with the full charging rate of 1000 amperes is very small, may be continually applied to insure a fully charged battery. Under this fully charged battery condition, the voltage across the rectifier network 42 will be just sufficient when compared to the voltage appearing across the terminals 5 and 6 to provide the desired current flow in the winding 40.

Assume that the terminal voltage of the battery B falls to a value of, for example, 6.59 volts. The voltage between the terminals 5 and 6 falls with respect to the voltage appearing across the direct-current output terminals of the network 42 and current through the saturating coil 40 will increase. This increase in current through the coil 40 will tend to increase saturation of the core of the reactor 38 thereby decreasing the voltage drop therethrough and increasing the voltage across the rectifier 36 with a consequent increase in current flow through the saturating windings 26, 28 and 30 of the reactor 10. This increase in current through the saturating windings of the reactor 10 will decrease the voltage drop thereacross and increase the voltage applied to the primary winding of the transformer 18, the primary winding of the transformer 44 and the reactor 38. This increased voltage across the primary winding of the transformer 44 will increase the voltage across the direct-current output terminals of the rectifier 42, which will still further increase the current flow through the coil 40 and cause a further increase in output voltage of the reactor 10 and of the rectifiers 20, 22 and 24. Also, the increased voltage across the conductors 32 and 34 will increase the current flow through the coils 26, 28 and 30 thereby adding its effect to still further increase the output voltage of the reactor 10.

This cycle of increasing voltage will continue until a balance is reached in which the differential between the effective direct-current voltage output of the rectifier 42 and voltage between the terminals 5 and 6 is exactly the value required to maintain these differentials. The system will charge the battery B at the rate determined by this balance until the battery builds up an increased voltage which raises the potential thereof and decreases the differential in voltage between that at the terminals 5 and 6 and that at the rectifier 42. The current flow through the winding 40 then decreases. This decrease in current will increase the voltage drop across the reactor 38 thereby decreasing the current flowing in the windings 26, 28 and 30 and increasing the voltage drop across the reactor 10. This decreases the voltage applied to the transformer 18 and therethrough to the terminals 5 and 6 reducing the charging rate. This lowering of the output voltage of the reactor 10 also lowers the output voltage of the rectifiers 42 and 36. The lowering of the output voltage of the rectifier 36 still further decreases the output voltage of the reactor 10 and the lowering voltage of the rectifier 42 provides a lower differential voltage, for causing current flow through the coil 40 thereby still further lowering the output voltage of the rectifier 36 which results in a further lowering of the output voltage of the reactor 10. This balancing cycle of lowering charging rate and voltages continues until a new balance between the output voltage of the rectifier 42 and battery terminal voltage results at which time the system is again in balance. It will be obvious, since the terminal voltages 5 and 6 will be continually increasing in a gradual manner during periods in which the battery is being charged with no closure of the contacts SWb, that the rate of charging will be continually decreasing with increasing charge in the battery B as the system continually finds new balance points. Conversely, with a decreasing charge of the batteries B, the charging rate will correspondingly increase. The system may be said to modulate its charging rate in accordance to the charged condition of the battery B.

The values of the various system components are so proportioned that the reactor 10 will fully saturate and the voltage drop thereacross will be a minimum when the battery voltage falls to approximately 6.50 volts. Of course, if it is desired, other voltage ranges may be utilized in keeping with the degree of tolerance in battery voltage which is permissible for the load supplied thereby by a proper proportioning of the voltage ratio of the transformer 44 and saturating effect of the winding 40. If the voltage ratio of transformer 44 is large, a relatively small change in battery voltage will initiate a great change in the output voltage of the rectifier 42 so that the reactor 38 will be completely saturated and substantially full-line voltage will be applied to the transformer 18 with a slight decrease in charge of the battery B. If a lesser voltage ratio of transformer 44 is provided, a relatively greater change in voltage of battery B will be necessary to saturate the reactor 38. This is true because the voltage cross the terminals 5 and 6 with no change in open circuit voltage of the battery B will increase with increase in charging rate. It is desirable to proportion the change of voltage of the rectifier 42 with respect to the change in voltage between terminals 5 and 6 so that a balance will be obtained within the range of the control of the reactor 38 for the desired range in battery voltage. In other words, the voltage between the terminals 5 and 6, plus the voltage drop across the winding 40 and resistor VR, must equal the effective output voltage of the rectifier 42. The charging rate characteristic may be represented by the locus of the intersection of the family of voltage curves representing the relationship between charging rate and voltage between the terminals 5 and 6 for various values of open-circuit battery voltages with a curve representative of the voltage output of rectifier 42 less the sum of the voltage drops across the winding 40 and resistor VR. This relationship may be made to provide various charging rates depending upon the setting of the resistor VR which in many respects will act much in the same manner as a change in the turn ratio of the transformer 44.

The foregoing operation has been discussed as if the switch SW1 were closed and the voltage supply to terminals 2, 3 and 4 were constant. Let us now consider the operation in which the voltage varies and the switch SW1 is open thereby connecting the control resistor 70 into the circuit of the winding 40. The value of the resistor VR is adjusted to provide the desired charging rate. If the voltage of terminals 2 and 3 is say 440 volts, the voltage of the secondary winding of transformer 62 will be 440 volts assuming a 1–1 ratio, although it is to be understood that other ratios may be used. The secondary voltage of the transformer 64 will be a controlled voltage of say 400 volts whereby a differential voltage of 40 volts is present to cause current to flow through the rectifier 66 and resistor 68. The resistor 68 assumes a predetermined temperature which temperature will increase the temperature of the resistor 70 causing its resistance to increase and increase the voltage differential requirements of the output of the rectifier 42 and the terminals 5 and 6 to control the current flow through the winding 40. In effect, the increase in resistance of resistor 70 will be equivalent to a lowering of the potential at the terminals 2, 3 and 4 to the normal value.

When the voltage at terminals 2 and 3 falls say to 420 volts, the differential in voltage between the secondary windings of the transformers 62 and 64 decreases to 20 volts and the current flow through, and the temperature of, the resistor 68 will fall. This decrease in temperature of the resistor 68 will lower the temperature of the resistor 70 thereby decreasing the potential difference between the rectifier 42 and terminals 5 and 6 necessary to maintain current flow through the winding 40. Likewise, an increase in voltage at terminals 2 and 3 will increase the voltage differential controlling flow through the resistor 68, causing its temperature to increase and increase the temperature and resistance of the resistor 70. This increase in value of resistor 70 raises the voltage differential requirements between rectifier 42 and terminals 5 and 6 to provide the same current flow through the coil 40. If now the effect of the resistor 70 is balanced against the effect of a change in voltage at the terminals 2, 3 and 4 it will compensate for changes in line voltage and the battery will be charged as if no change in line voltage had occurred. It should be here noted that when the network 60 is used, the conductor 39 and winding 40 should always be subjected to at least a minimum current so that the effect of changes in the value of the resistor 70 will effect the current flow through the coil 40.

Now that the theory of operation and arrangement of the apparatus has been set forth, those skilled in the art may now, by the use of the normal design material made use of by designers of electrical apparatus, select and/or design the specific apparatus which will provide a charging rate having the desired characteristics for the particular batteries utilized and for the particular voltage characteristics which may be required for the load circuit with which it may be utilized. It will be appreciated that since the effect of the network 60 is to compensate the control circuit through the winding 40 for changes in line voltage, the transformer 44 could be connected to a constant source of potential if such were available. In this event, the transformer 44 would not act to progressively increase the voltage differential between that of the rectifier 42 and the terminals 5 and 6 but a similar effect will be produced by the increasing voltage across the conductors 32 and 34 which will provide a progressively increasing current flow in the windings 26, 28 and 30 to progressively increase the voltage supplied to the transformer 18 until a balance similar to that before described is attained.

Under conditions of operation in which the voltage between terminals 5 and 6 will be materially reduced when a load such as applicant's welding load is connected thereto, it may be desirable to prevent the normal functioning of the charger during the duration of these loads. Under other circumstances, the duration of the load and the reduction in voltage of the terminals of the battery B is sufficiently short as compared to the time required to adjust the charger mechanism 1, and no great increase in charging current accompanies the connection of the load to the battery B even though an adjustment of the charger control is not made. Since the time required to effect a control in the charger system 1 may vary considerably depending upon the various time constants of the reactors and transformers involved, it is now considered most desirable to readjust the charging mechanism 1 to prevent an undesired increase in charging current during intervals when the electrodes E are energized. The switch contacts SWa are arranged to open during closure of the contacts SWb whereby the resistor R1 acts to reduce the voltage supplied to the rectifier 36. If the current flowing through the conductor 34 at the time the load is applied is small, as occurs with the batteries B substantially fully charged, the voltage to the reactor 36 and across the windings 26, 28 and 30 will not drop appreciably and the opening of the contacts SWa will have no appreciable immediate effect. As, however, the voltage between terminals 5 and 6 drops, the differential in voltage between terminals 5 and 6 and the rectifier 42 increases and the resistor R1 will limit the increase in voltage at the rectifier 36. When, however, the charge of the batteries B is low, substantial current is delivered by the load circuit to the battery B and a substantial current will be flowing in the line 34. Under these conditions, the opening of the contacts SWa very quickly reduces the voltage applied to the rectifier 36 and to the reactor 38 because of the voltage drop through the resistor R1, which reduces the D.-C. voltage of the rectifier 36 and lowers the flow of current through the windings 26, 28 and 30. The reactance of the reactor 18 will increase thereby reducing the charging voltage so that the charging current flowing through the rectifiers 20, 22 and 24 to the battery B is not unduly increased due to drop of the terminal voltage of the battery B.

It will be apparent that for every open-circuit voltage of the battery B a predetermined charging current will be supplied thereto; that with the voltage effect produced by connecting the transformer 44 and lines 32 and 34 to the changing output voltage of the reactor 18 a small change in battery voltage may be made to cause a large change in charging current; that such a connection may be made to just balance the increase in terminal voltage of the battery due to the charging thereof so that with the reactor 38, which is designed to provide a voltage change in direct proportion to change in current flow through its saturating winding 40, a charge rate may be applied to the battery in direct proportion to its decrease in open-circuit terminal voltage; and that compensation may be provided for changes in voltage of the electrical energy supply.

What is claimed and is desired to be secured by United States Letters Patent is as follows:

1. In a battery-charging mechanism, a first pair of terminals adapted to be connected to a battery to be charged, a second pair of terminals adapted to be connected to a source of alternating current power, means interconnecting said pairs of terminals including a reactor having output terminals and a rectifier, said rectifier being supplied with alternating current from said second pair of terminals through said reactor output terminals, means controlling the effective reactance of said reactor whereby the voltage at said rectifier may be regulated, means including take-off conductors connected to and deriving a control voltage from said reactor output terminals, said controlling means including means responsive to the difference in voltage between that appearing across said first pair of terminals and said control voltage, and means responsive to changes in voltage at said second pair of terminals for varying the response of said differential voltage responsive means to changes in said difference in voltage, said control voltage being proportional to the voltage of said reactor output terminals.

2. In a battery-charging mechanism, a first pair of terminals adapted to be connected to a battery, a second pair of terminals adapted to be supplied with alternating current power, circuit means including rectifying means interconnecting said pairs of terminals whereby direct current power may be supplied to said first pair of terminals, means controlling the voltage supplied to said first pair of terminals, and means regulating said voltage-controlling means, said regulating means including means responsive to the differences of two opposing voltages, one of said opposing voltages being proportional to the voltage appearing between said first pair of terminals, the other of said opposing voltages being proportional to the voltage delivered to said rectifying means, and means responsive to changes in magnitude of the voltage at said second pair of terminals for compensating said regulating means for such changes in terminal voltage.

3. In a battery-charging mechanism, a first pair of terminals adapted to be connected to a battery, a second pair of terminals adapted to be supplied with alternating current power, circuit means including rectifying means interconnecting said pairs of terminals whereby direct current power may be supplied to said first pair of terminals, means controlling the voltage supplied to said first pair of terminals, means regulating said voltage-controlling means, said regulating means including means responsive to the differences of two opposing voltages, one of said opposing voltages being proportional to the voltage appearing between said first pair of terminals, the other of said opposing voltages being derived from a transformer energized by a voltage proportional to the voltage delivered to said rectifying means, and means for selectively controlling the response of said regulating means to changes in said differential voltage.

4. In a battery-charging mechanism, a first pair of terminals adapted to be connected to a battery, a second pair of terminals adapted to be connected to a source of alternating current power, means electrically connecting said pairs of terminals and including a voltage-controlling means and a rectifier, said voltage-controlling means being intermediate said second pair of terminals and said rectifier, regulating means including means responsive to the voltage of the battery connected to said first pair of terminals and means responsive to the output voltage of said voltage controlling means, said voltage-responsive means being arranged relative to each other to produce opposing effects on said voltage-controlling means, said last-named voltage responsive means being arranged to provide an effect which increases proportionally with an increasing output voltage of said voltage controlling means, said regulating means being responsive to the differential effect between the effect produced by said first-named and said second-named voltage-responsive means for adjusting the voltage supplied to said rectifier.

5. In a battery-charging mechanism, a first pair of terminals adapted to be connected to a battery, a second pair of terminals adapted to be connected to a source of alternating current power, means electrically connecting said pairs of terminals and including a voltage-controlling means and a rectifier, said voltage means being intermediate said second pair of terminals and said rectifier, regulating means for adjusting the voltage supplied to said rectifier including means responsive to the voltage of the battery connected to said first pair of terminals and means responsive to the output voltage of said voltage means, said voltage-responsive means being arranged relative to each other to produce opposing effects on said voltage regulating means, and means for selectively controlling the effect produced on said regulating means by said opposing effects.

6. In a battery-charging mechanism, a first pair of terminals adapted to be connected to a battery, a second pair of terminals adapted to be connected to a source of alternating current power, a saturable core-type reactor having a main winding and a saturating winding, a power transformer having a primary winding and a secondary winding, said primary winding being connected across said second pair of terminals and in a series with said reactor main winding, a rectifier means having one terminal connected to one end of said secondary winding and having its other terminal connected to one of said first pair of terminals, the other of said first pair of terminals being connected to the other end of said secondary winding, a control circuit adapted to be energized with alternating current and including a rectifier means having its direct current terminals connected to supply direct current to said saturating winding, a saturable reactor controlling flow of current through said control circuit and having a saturating coil, and a transformer having its primary winding connected in parallel with said power transformer primary winding, said last-named transformer having a secondary winding connected to the alternating current input terminals of a rectifier means having its direct current output terminals connected in a series with said last-named saturating coil, said series connected saturating coil and direct current output terminals being connected to said first pair of terminals whereby the current flow through said saturating coil is proportional to the difference in voltage appearing across said first pair of terminals and that appearing across said direct current output terminals.

7. In a battery-charging mechanism, a first pair of terminals adapted to be connected to a battery, a second pair of terminals adapted to be connected to a source of alternating current power, a saturable reactor deriving current from said second pair of terminals and having a saturating coil and output terminals, a rectifier connected to said reactor terminals and delivering direct current power to said first pair of terminals, means for supplying said coil with direct current, a transformer having a primary and a secondary winding, means connecting said primary winding with said reactor output terminals, full-wave rectifier means connected to be supplied from said secondary winding, circuit means interconnecting the direct-current output of said rectifier means in opposition to the voltage appearing across said first pair of terminals, means responsive to the difference in voltage across said first pair of terminals and across said direct-current output for controlling current flow to said coil, and means responsive to changes in potential at said second pair of terminals for varying the effect of said direct-current output on said last-named responsive means.

8. In a control system, a network, a source of potential for said network, means responsive to current flow in said network under control of said source, means controlling said flow of current including a source of control potential and a source of potential the magnitude of which is proportional to the magnitude of said first-named source, and means responsive to the differential in voltage between said control potential and said last-named potential for regulating said current flow.

9. The combination of claim 8 in which said first-named source comprises two opposed voltages and said differential responsive means comprises a resistance heater element in heat exchange relation with a resistor arranged in series circuit in said network with said first-named responsive means.

10. The combination of claim 8 in which said constant potential is provided by a constant potential output transformer supplied with energy from said first-named source.

11. In a battery-operated heating system, a heating circuit receiving electrical energy from the battery, a charging network for the battery comprising conductors adapted to be connected to a source of alternating current energy and operatively connected to the battery, rectifying means associated with said conductors whereby unidirectional current is supplied to charge the battery, reactance means controlling the flow of current to the battery, means responsive to the charged condition of the battery for controlling said reactance means, and means responsive to the energization of said heating circuit for controlling said reactance means.

12. In an electrical network for supplying a heating circuit, a first pair of terminals operable to supply electrical energy to the heating circuit, an electrical energy storage device having output conductors connected to said terminals, a second pair of terminals adapted to be secured to a source of alternating current electrical energy, a saturable reactor, a transformer, a rectifier, circuit means connecting said reactor and said transformer and said rectifier in series arrangement between said pairs of terminals, and heat abstracting means associated with and for maintaining said reactor and said transformer and said rectifier within predetermined temperature limits.

13. The combination of claim 12 in which said transformer and said rectifier and said reactor are positioned with a single fluid-tight container and in which said heat abstracting means is a liquid contained within and substantially filling said container.

14. The combination of claim 13 in which means is provided to circulate said liquid within said container.

CHESTER F. LEATHERS.

REFERENCES CITED

The following references are of record in the file of this patent:

UNITED STATES PATENTS

| Number | Name | Date |
|---|---|---|
| 1,284,216 | Beauchamp | Nov. 12, 1918 |
| 1,965,439 | Stoller | July 3, 1934 |
| 1,993,914 | Bohm | Mar. 12, 1935 |
| 2,018,348 | Dijksterhuis | Oct. 22, 1935 |
| 2,040,492 | Logan | May 12, 1936 |
| 2,083,382 | Jutson et al. | June 8, 1937 |
| 2,085,061 | Aggers | June 29, 1937 |
| 2,125,110 | Harty | July 26, 1938 |
| 2,272,745 | Hinds et al. | Feb. 10, 1942 |
| 2,311,574 | Richards | Feb. 16, 1943 |
| 2,334,528 | Amsden | Nov. 16, 1943 |
| 2,346,997 | Priest | Apr. 18, 1944 |
| 2,373,383 | Christopher | Apr. 10, 1945 |
| 2,378,607 | Stratton | June 19, 1945 |
| 2,383,722 | Haug | Aug. 28, 1945 |
| 2,390,151 | Johnston | Dec. 4, 1945 |
| 2,423,114 | Potter | July 1, 1947 |

FOREIGN PATENTS

| Number | Country | Date |
|---|---|---|
| 515,266 | Great Britain | Nov. 30, 1939 |
| 535,702 | Great Britain | Apr. 18, 1941 |